(12) United States Patent
Lin

(10) Patent No.: US 7,958,816 B2
(45) Date of Patent: Jun. 14, 2011

(54) MULTI-FUNCTION BEVERAGE BREWER AND CUP

(76) Inventor: Shin-Shuoh Lin, Laguna Hills, CA (US)

( * ) Notice: Subject to any disclaimer, the term of this patent is extended or adjusted under 35 U.S.C. 154(b) by 956 days.

(21) Appl. No.: 11/897,697

(22) Filed: Aug. 31, 2007

(65) Prior Publication Data
US 2009/0056557 A1 Mar. 5, 2009

(51) Int. Cl.
*A47J 31/02* (2006.01)
(52) U.S. Cl. ......................................................... 99/323
(58) Field of Classification Search .................. 220/212, 220/592.17, 256.1, 255, 568, 716, 718, 713, 220/254.1, 254.8, 521, 522, 528, 506, 524; 215/356, 228, 387; 206/219; 222/146.5, 222/145.5, 189.06; 366/347, 130, 475.1; 99/317, 321, 318, 319, 316, 323, 323.3, 413, 99/417
See application file for complete search history.

(56) References Cited

U.S. PATENT DOCUMENTS

| | | | |
|---|---|---|---|
| 3,799,408 A | 3/1974 | Palmer | |
| 4,625,884 A | 12/1986 | Zimmermann | |
| 4,721,835 A * | 1/1988 | Welker | 219/689 |
| 4,754,888 A | 7/1988 | Letsch | |
| D307,229 S | 4/1990 | Grolman | |
| 4,977,820 A | 12/1990 | Lin | |
| 5,168,140 A * | 12/1992 | Welker | 219/689 |
| 5,417,906 A * | 5/1995 | Chiodo | 264/153 |
| 5,531,353 A * | 7/1996 | Ward et al. | 220/729 |
| 5,553,731 A * | 9/1996 | Schuyler | 220/719 |
| 5,653,362 A | 8/1997 | Patel | |
| 5,918,761 A * | 7/1999 | Wissinger | 220/713 |
| 6,269,984 B1 | 8/2001 | Murakami | |
| 6,374,726 B1 * | 4/2002 | Melton | 99/323 |
| 6,505,752 B1 | 1/2003 | Rolfes et al. | |
| D482,238 S | 11/2003 | Lin | |
| 2001/0036124 A1 * | 11/2001 | Rubenstein | 366/205 |
| 2004/0031714 A1 * | 2/2004 | Hanson | 206/505 |
| 2006/0162572 A1 * | 7/2006 | Chiu et al. | 99/317 |

* cited by examiner

*Primary Examiner* — Henry Yuen
*Assistant Examiner* — Thien Tran
(74) *Attorney, Agent, or Firm* — Gordon K. Anderson

(57) ABSTRACT

A multi-function beverage brewer and cup (10) is taught that includes a travel mug (20) with a filter basket (26) that is removably placed within a top opening of the travel mug. A brewed beverage is created by pouring hot water over tea leafs or coffee grounds that have been placed into the filter basket. A storage container (38), including a lid (40), is used to retain additional tea leafs or coffee grounds and is removably attached to the travel mug. A holding cup (54) engages a lower outside surface of the travel mug for storage. When a beverage is brewed the holding cup and filter basket are removed from the travel mug and the filter basket containing tea leaf or coffee ground residue are stored in the holding cup and a basket/cup cover (34) encloses the holding cup.

14 Claims, 6 Drawing Sheets

MULTI-FUNCTION BEVERAGE BREWER AND CUP

TECHNICAL FIELD

The present invention relates to liquid containing vessels in general. More specifically the invention is for a beverage brewer utilizing, a travel mug with a filter basket for holding the brew product, a storage container to hold additional product also a removable cup for retaining product residue after brewing.

BACKGROUND ART

Previously, many types of beverage containers have been used in endeavoring to provide an effective means to hold liquid beverages preventing heat transfer. Individual brewers have also been developed that require only hot water to complete the brewing process.

The prior art listed below did not disclose patents that possess any of the novelty of the instant invention; however the following U.S. patents are considered somewhat related:

| Patent Number | Inventor | Issue Date |
| --- | --- | --- |
| 3,799,408 | Palmer | Mar. 26, 1974 |
| 4,625,884 | Zimmermann | Dec. 2, 1986 |
| 4,754,888 | Letsch et al. | Jul. 5, 1988 |
| D307,229 | Grolman | Apr. 17, 1990 |
| 4,977,820 | Lin | Dec. 18, 1990 |
| 5,653,362 | Patel | Aug. 5, 1997 |
| 5,918,761 | Wessinger | Jul. 6, 1999 |
| 6,269,984 | Murakami | Aug. 7, 2001 |
| 6,505,752 | Rolfes et al. | Jan. 14, 2003 |
| D482,238 S | Lin | Nov. 18, 2003 |

Palmer in U.S. Pat. No. 3,799,408 teaches an internally threaded mounting ring engaged to the threaded neck of a vacuum bottle. A sleeve is provided having a small diameter end for engagement with the bottle neck. The outer large diameter of the sleeve faces outwardly and a tapered stopper-type closure swings on an arm for engagement. The closure is manipulated at the handle to swing the stopper into and out of position closing the opening in the vacuum bottle.

U.S. Pat. No. 4,625,884 issued to Zimmermann is for an insulated jug having a protective housing of synthetic material forming a spout. A recess is formed in the top to receive a lid that is threaded on its lower portion with insertion providing a seal. Pouring is accomplished through the relieved portion on the threaded part of the lid.

Letsch et al. in U.S. Pat. No. 4,754,888 discloses a thermos carafe with an inner container surrounded by a casing. The inner container and the casing are open on the top which is closed using a plug. The plug and/or the opening are shaped in such a manner that it is possible to fill and empty the inner container while the plug is left in the opening.

U.S. Pat. No. 4,977,820 of Lin is for a brewer having an open upper end and a retainer cup of reduced size with an outward flange formed on the upper end of the retainer, also two notches formed in a lower end of the cup. Holes are formed in the peripheral surface along with the bottom. The notches are configured to engage the container.

Patel in U.S. Pat. No. 5,653,362 teaches a beverage server having a body with an internal reservoir to hold a beverage such as hot coffee. A lid is pivotally connected to the top of the body. The lid has a conical passage permitting a beverage to pass into the reservoir without removing the lid. A floatable ball is located in the passage for sealing when no liquid is entering the server. A pouring spout extends from the body and is in fluid communication with the reservoir when the beverage server is tilted and the lid pivots. A counter weight in the lid assists smooth motion functioning.

U.S. Pat. No. 6,269,984 issued to Murakami is for a dispensing stopper for a bottle eliminating accumulated residue. The stopper includes a base mounted on the bottle mouth, a seal on the base and a movable gasket moving toward and away from the sealing surface on the bottle. A thin web of resilient material seals a fixed section and the gasket section.

For background purposes and as indicative of the art to which the invention is related reference may be made to the remaining cited patents issued to Wessinger U.S. Pat. No. 5,918,761, Rolfes et al. U.S. Pat. No. 6,505,752, Lin in U.S. design Pat. D482,238S and Grolman in U.S. design Pat. D307,229.

DISCLOSURE OF THE INVENTION

In the past brewing a beverage such as tea and coffee have been accomplished by pouring hot or boiling water over tea leafs or coffee grounds and letting the product steep until the desired strength is accomplished and then removing or straining the residue before use. In today's world time is important and many would like to have the ability to carry the beverage with them when in a vehicle or at work on a personal basis. Previously it is necessary to have a brew pot separate from a travel mug which requires a heat source or at least access to hot water and a separate container for carrying.

It is therefore a primary object of the invention to combine a vacuum insulated travel mug with a removable filter basket allowing the user to simply add hot water over the filter basket to the product and be able to remove and store the residue when the beverage is properly brewed. The invention provides this convenience all in one self contained multi-function package.

An important object of the invention is in its flexibility as it is not only a brewer but permits the user to enjoy the beverage while traveling as the mug is of a convenient size to fit into conventional cup holders generally provided in modern vehicles. Since it is insulated the beverage stays hot for extended periods of time.

Another object of the invention is the ease of storage of the residue remaining from the tea leafs or coffee grounds as a holding cup is nested onto the bottom portion of the travel mug and is easily removed by separating the two items. When the brewing is completed the filter basket is removed from the mug and placed in the holding cup with a cover provided that seals the cup therefore permitting the user to drink directly from the mug.

Still another object of the invention is realized with the storage container provided that retains a quantity of product for further brewing and the container also acts as a stopper when the mug is empty. The invention provides supplementary storage space within the holding cup for additional residue.

A final object of the invention is its convenience since it provides brewing directly in the travel mug for drinking with storage of the residual tea leafs or coffee grounds in a separate holding cup, both of which have lids to prevent spillage. Further the travel mug may be used by itself with hot or cold beverages or likewise the cup may be used separately for any liquid holding purpose.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
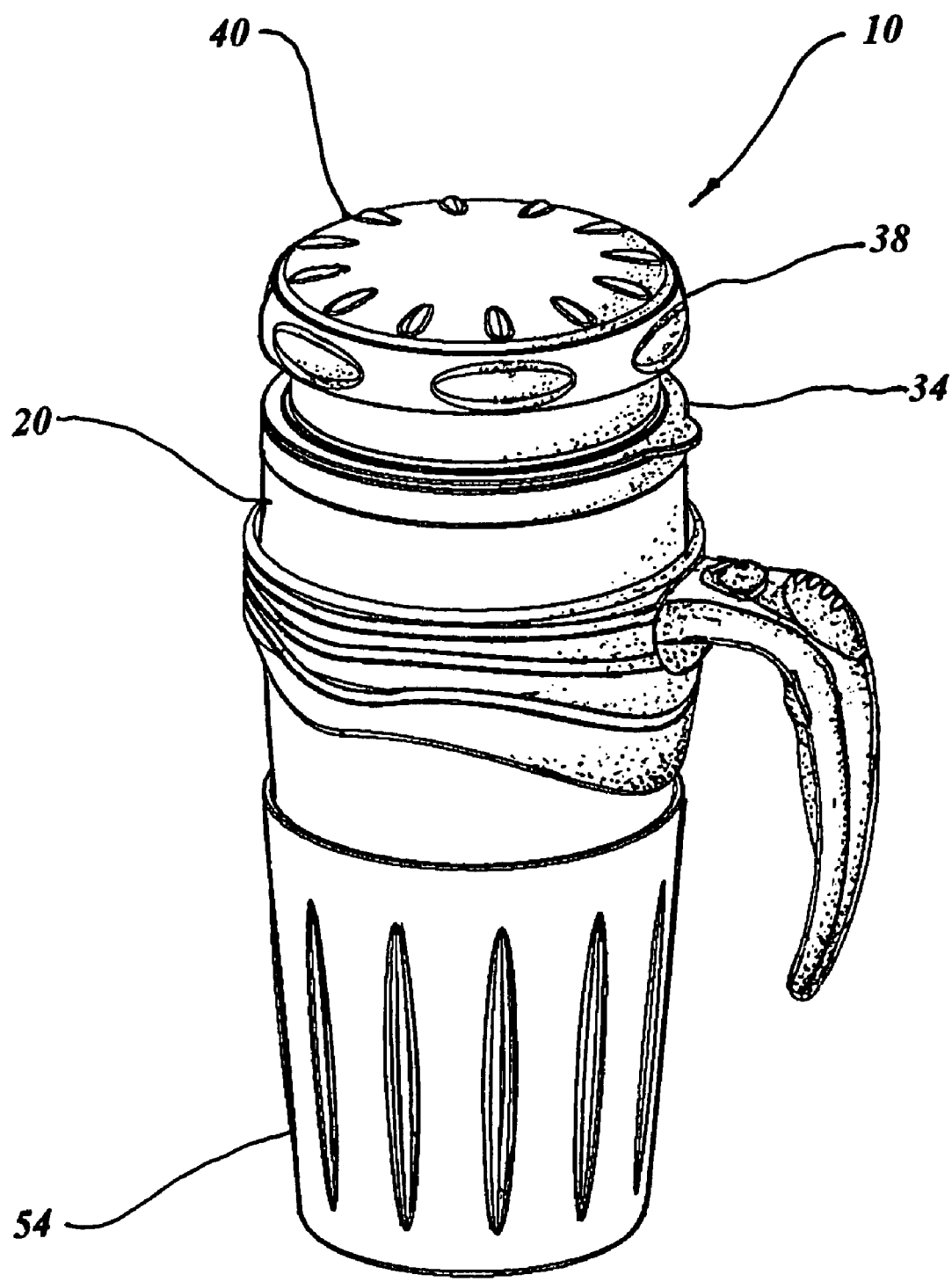
FIG. 1 is a partial isometric view of the assembled multi-function beverage brewer and cup in the preferred embodiment.
Figure 2:
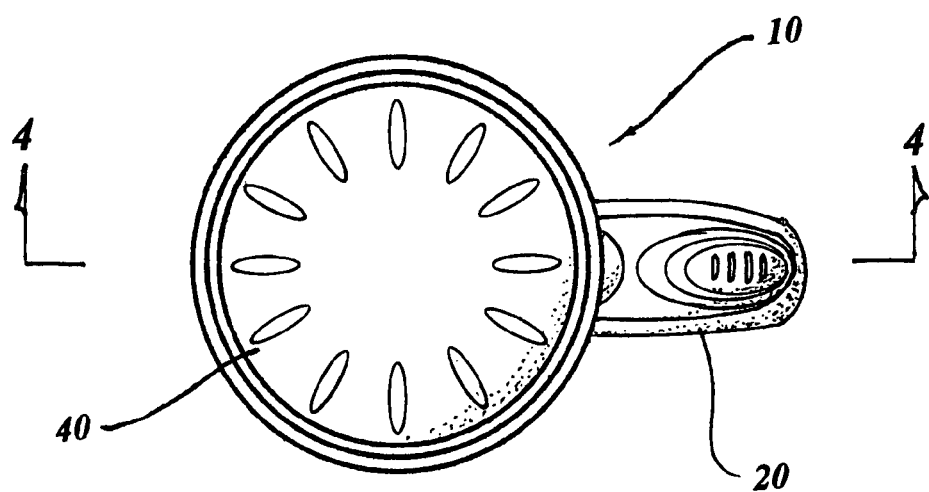
FIG. 2 is a top view of the assembled multi-function beverage brewer and cup in the preferred embodiment.
Figure 3:
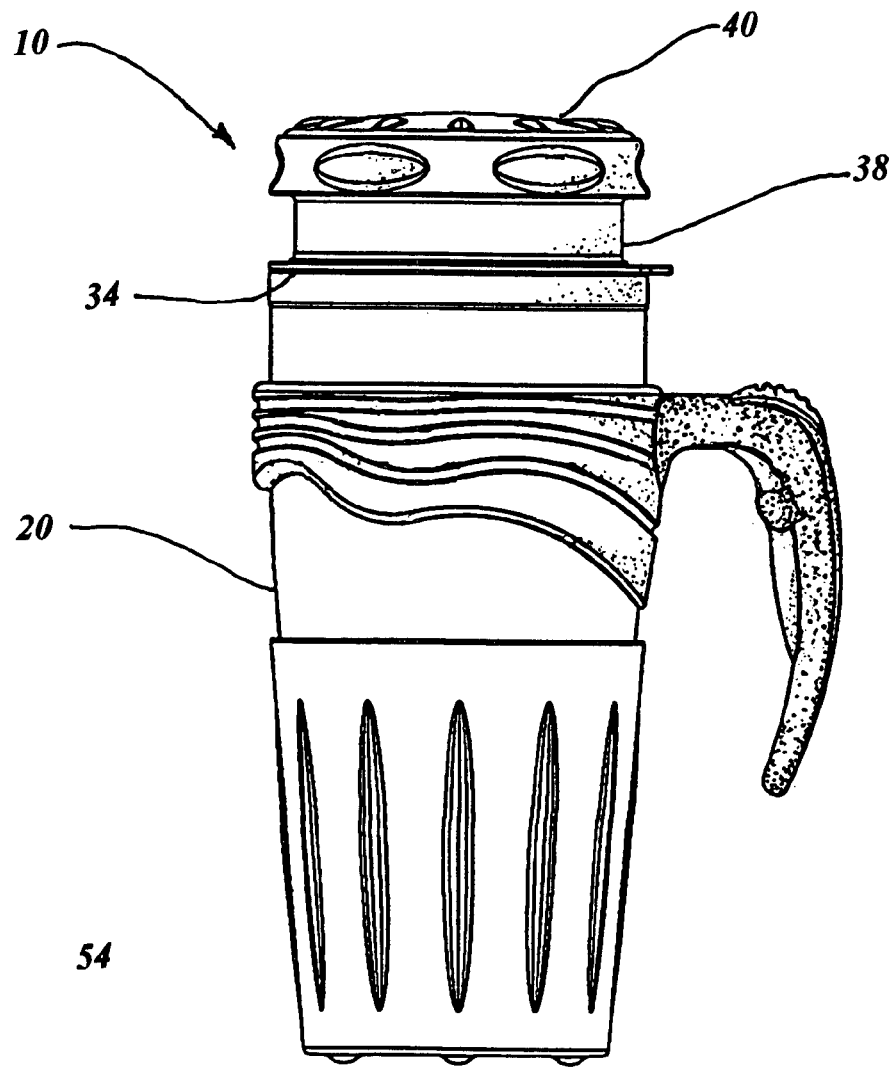
FIG. 3 is a left view of the assembled multi-function beverage brewer and cup in the preferred embodiment.

The best mode for carrying out the invention is presented in terms of a preferred embodiment of the multi-function beverage brewer and cup 10. This preferred embodiment is shown in FIG. 1 thorough 13. The beverage brewer and cup 10 is comprised of a travel mug 20 having a handle thereon and a top opening 22 preferably incorporating a double wall vacuum, stainless steel construction. The travel mug 20, shown in FIGS. 1-5 and 12, is preferably formed with a seamless inside surface and contains a bottom cushion 24. It will be noted that the basic shape of the preferred travel mug 20, less cover, is disclosed in the instant inventors own U.S. design Pat. D482,238S.

Figure 4:
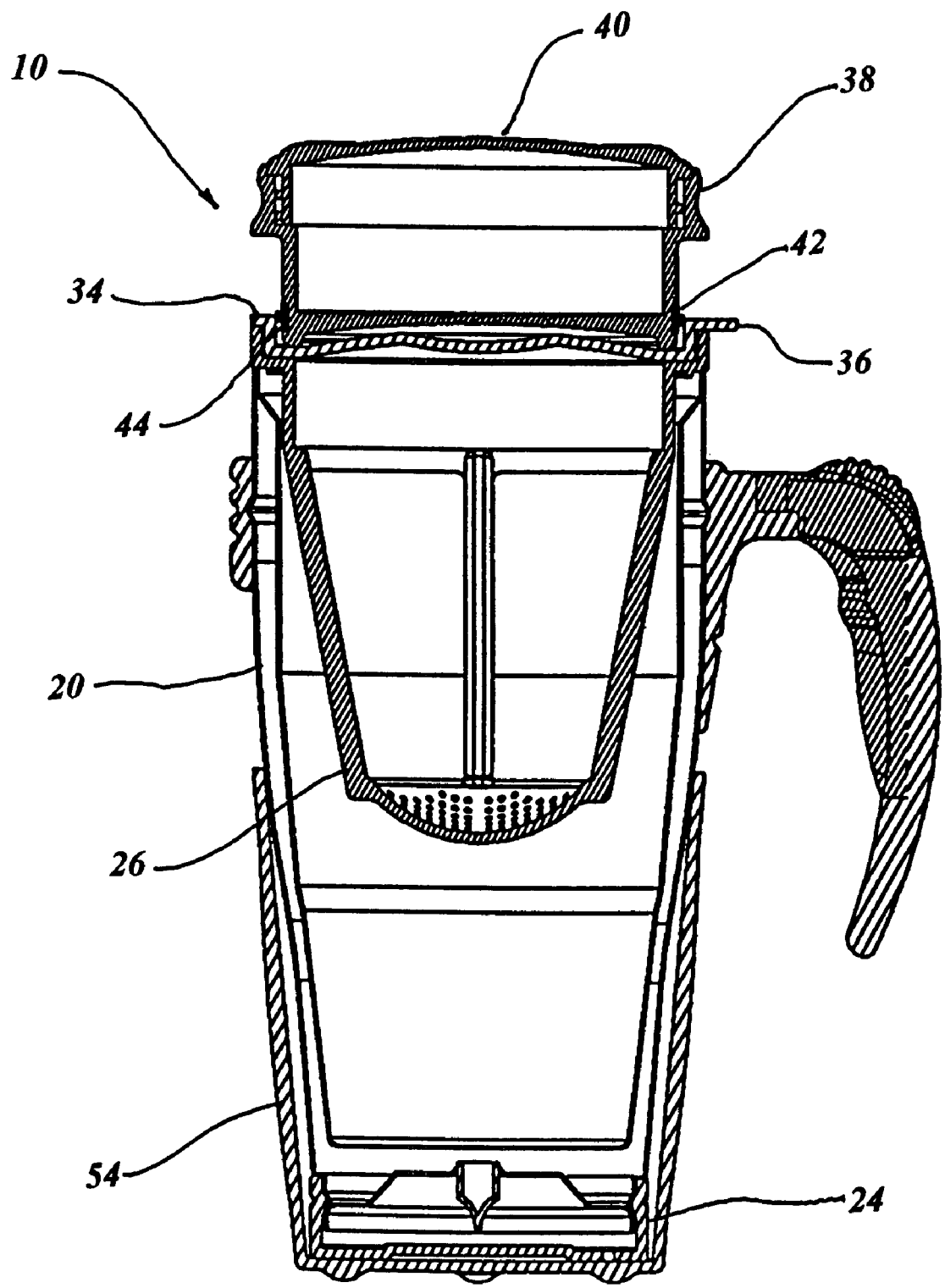
FIG. 4 is a cross sectional view taken along lines 4-4 of FIG. 2.
Figures 5, 6, 7:
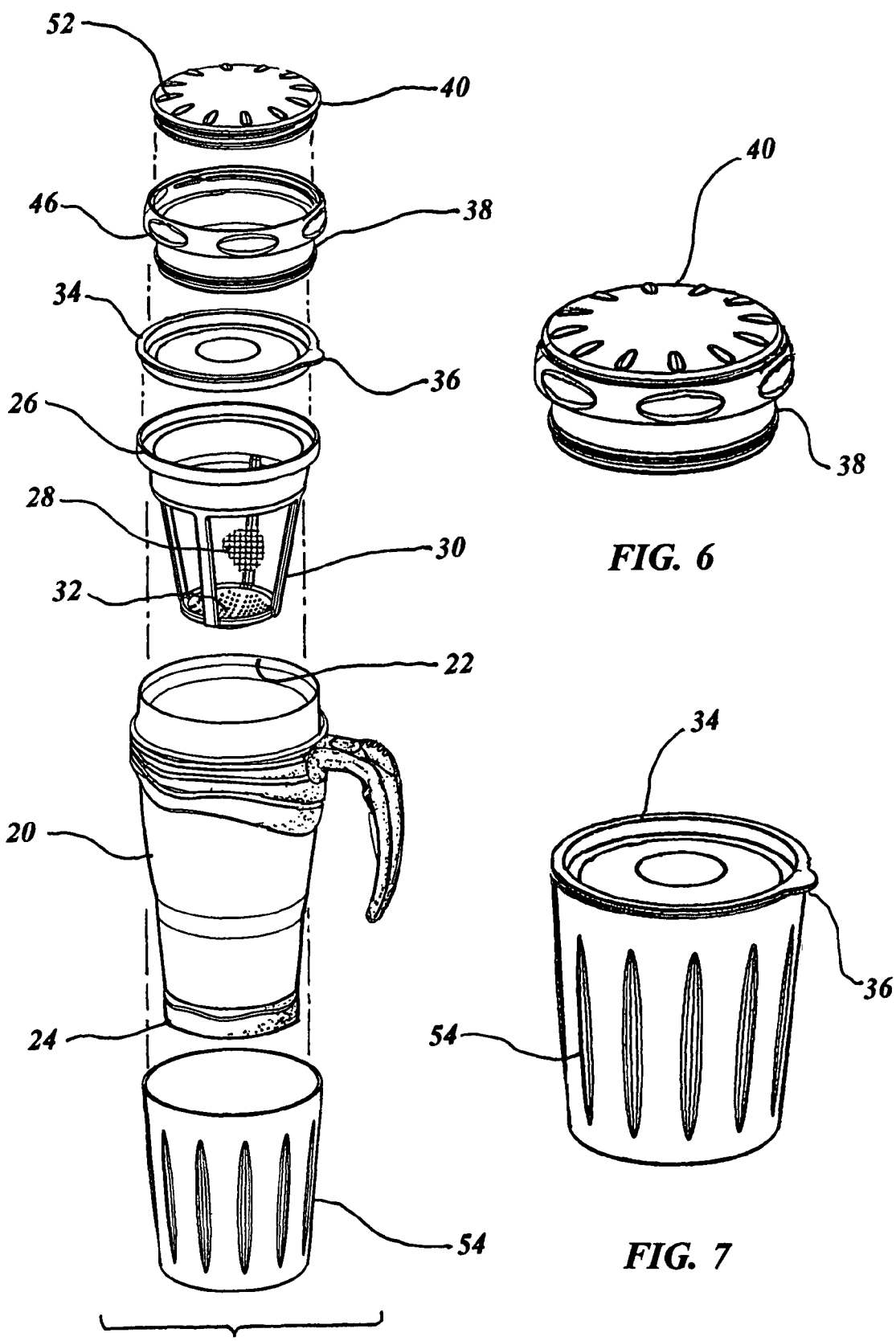
FIG. 5 is an exploded view of the multi-function beverage brewer and cup in the preferred embodiment.
FIG. 6 is a partial isometric view of the storage container with its lid assembled completely removed from the invention for clarity.
FIG. 7 is a partial isometric view of the filter basket/beverage residue holding cup with the basket/cup cover attached, shown alone for clarity.
Figure 8:
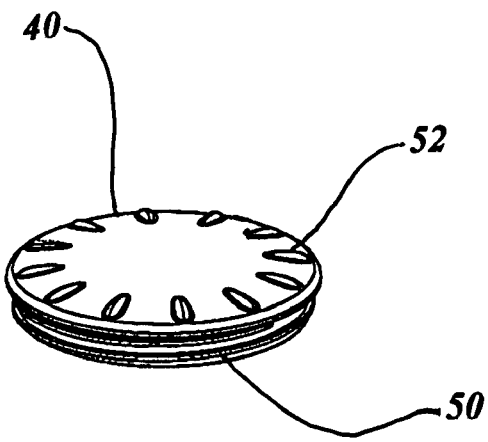
FIG. 8 is a partial isometric view of the storage container lid completely removed from the invention for clarity.
Figure 11:
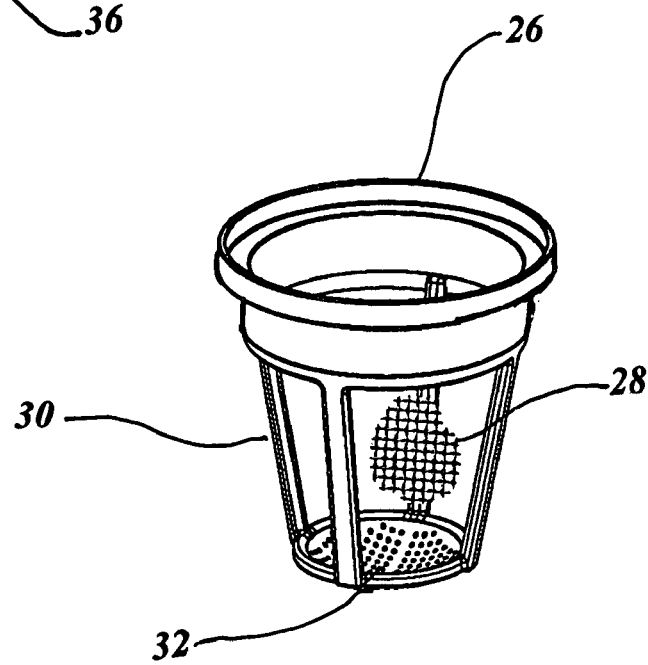
FIG. 11 is a partial isometric view of the filter basket completely removed from the invention for clarity.
Figure 12:
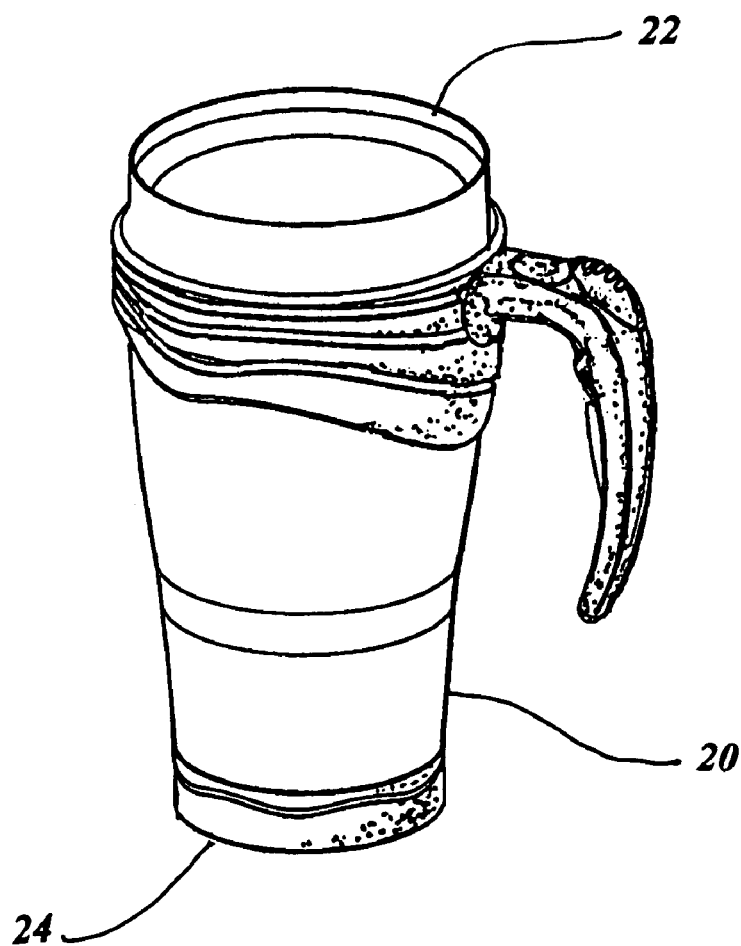
FIG. 12 is a partial isometric view of the travel mug completely removed from the invention for clarity.
Figure 13:
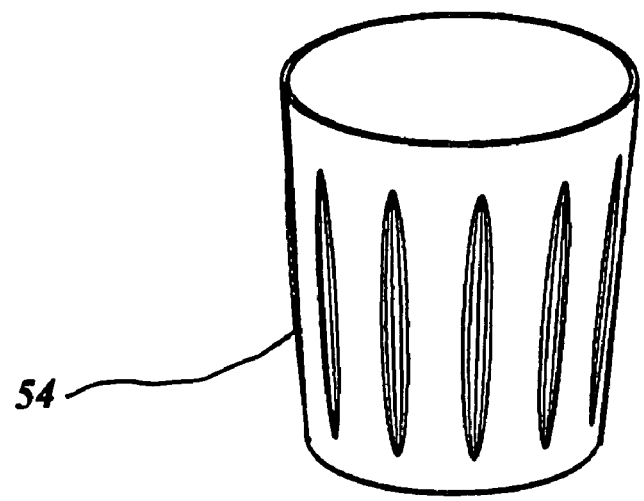
FIG. 13 is a partial isometric view of the filter basket/beverage residue holding cup completely removed from the invention for clarity.

A filter basket 26, illustrated in FIGS. 4, 5 and 11 is used for holding beverage tea leafs or coffee grounds and is removably disposed within the top opening 22 of the travel mug 20. When hot water is poured over tea leafs or coffee grounds within the filter basket 26 a brewed beverage is created within the travel mug 20. The filter basket 26 preferably utilizes a stainless steel mesh screen 28 that is inserted circumferentially within a thermoplastic cage 30. The filter basket 26 is used to contain beverage leafs and grounds. When hot water is poured over this product a consumable beverage is produced. The filter basket cage 30 incorporates a perforated bottom 32 and is constructed of a thermoplastic material such as polypropylene, acrylic, allyl diglycol carbonate, polycarbonate, polystyrene, polysulfone, polyester sulfone or polyester.

Figure 10:
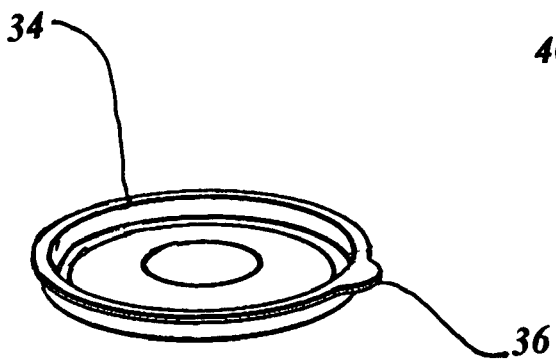
FIG. 10 is a partial isometric view of the basket/cup cover completely removed from the invention for clarity.

A basket/cup cover 34 is provided that fits snugly into a top surface of the filter basket 26, as illustrated in FIGS. 4, 5 and 10 and is recessed with a flange on the top and incorporates a lifting tab 36 on one side. Again the material may be polypropylene, acrylic, allyl diglycol carbonate, polycarbonate, polystyrene, polysulfone, polyester sulfone or polyester.

Figure 9:
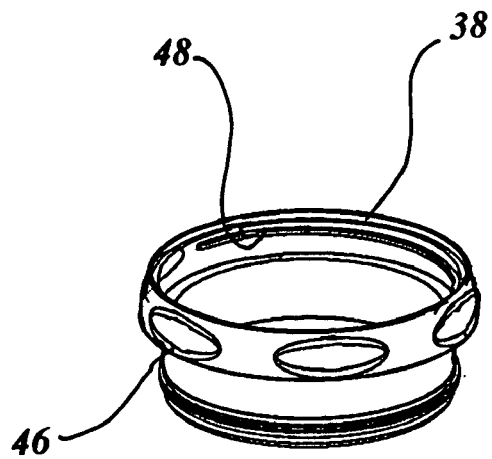
FIG. 9 is a partial isometric view of the storage container completely removed from the invention for clarity.

A storage container 38 is removably disposed onto a top portion of the basket/cup cover 34 and is used for retaining beverage tea leafs or coffee grounds. The storage container 38 is depicted in FIGS. 5, 6 and 9 and includes a storage container lid 40, shown alone in FIG. 5, which is removably attached to the storage container 38 for enclosing contents retained therein, i.e. tea leafs or coffee grounds. The storage container 38 includes a recessed groove 42 and a circumferential gasket 44 imbedded within this recessed groove 42, as illustrated in the cross section drawing of FIG. 4. Further hand gripping protrusions 46 are provided around a peripheral edge of the container 38 for use when removing the container 38 from the basket/cup cover 34. Internal threads 48 are provided within an upper portion of the container 38 for mating with the storage container lid 40 and the storage container lid 40 incorporates external threads 50 for mating with the internal threads 48 of the storage container 38 creating a seal therebetween.

The storage container lid 40 preferably has a number of equally spaced finger protrusions 52 on its top surface and both the storage container 38 and its accompanying lid 40 are preferably formed with a thermoplastic material selected from the group consisting of polypropylene, acrylic, allyl diglycol carbonate, polycarbonate, polystyrene, polysulfone, polyester sulfone and polyester.

A filter basket/beverage residue holding cup 54 removably embraces a lower outside surface of the travel mug 20 and after the beverage within the travel mug 20 has has been consumed by the user the holding cup 50 may be removed from the travel mug 20. The filter basket 26 may also be removed including the residue of the tea leafs or coffee grounds within and is then placed into the holding cup 54 and enclosed with the basket/cup cover 34. The holding cup 54 has an inside diameter sized to fit snugly over a bottom portion of the travel mug 20, as shown in FIGS. 1-4 for transportation, and yet is easily removed by pulling the two apart. The holding cup 54 may likewise be made of polypropylene, acrylic, allyl diglycol carbonate, polycarbonate, polystyrene, polysulfone, polyester sulfone or polyester and the like.

The most common method of use starts with the assembled beverage brewer and cup 10, as illustrated in FIGS. 1-4 which is then taken apart, and tea leafs or coffee grounds are placed in the filter basket 26 and, if desired, also in the storage container 38 with the storage compartment lid 40 replaced by screwing together. The filter basket 26 is then placed in the top opening 22 of the travel mug 20 and taken to a source of hot water where the hot water is poured over the tea leafs or coffee grounds which remain in the water until steeped to the desired strength of the brew. The filter basket 26 may then be removed and placed in the holding cup 54 with the basket/cup cover 34 inserted into a recess in the filter basket 26 enclosing the holding cup 54. When the brew has been consumed by the user the storage container 38 may covered with the storage container 38 and its attached lid 40 as shown alone in FIG. 6.

The above steps may be used in sequence however it is not limited to only the outline above as the utility of the invention permits a myriad of combinations in procedure such as storing any number of batches of tea leafs or coffee grounds within the holding cup 54 and even using the cup 54, mug 20 and storage container 38 for other useful purposes.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. A multi-function beverage brewer which comprises:
   a travel mug having a handle thereon, a top opening and a configuration sized to fit into conventional cup holders generally provided in modern vehicles, wherein said travel mug further comprises a double wall vacuum construction with a seamless inside surface,
   a filter basket for holding beverage tea leafs or coffee grounds, removably disposed within the top opening of the travel mug, such that when hot water is poured over tea leafs or coffee grounds within the filter basket a brewed beverage is created within the travel mug,
   a basket/cup cover fitting snugly into a top surface of the filter basket, with said basket/cup cover having a lifting tab,
   a storage container for retaining beverage tea leafs or coffee grounds, removably disposed onto the basket/cup cover for use with the beverage brewer,
   a storage container lid removably attached to the storage container for enclosing contents retained therein, and
   a filter basket/beverage residue holding cup removably embracing a lower outside surface of the travel mug, such that when a beverage is brewed the holding cup and filter basket may be removed from the travel mug and the filter basket containing tea leafs or coffee grounds residue may be placed into the holding cup and enclosed with the second basket/cup cover, wherein said filter basket/beverage residue holding cup having an inside diameter sized to fit snugly over a bottom portion of the travel mug.

2. The multi-function beverage brewer as recited in claim 1 wherein said travel mug further comprising a bottom cushion.

3. The multi-function beverage brewer as recited in claim 1 wherein said filter basket further comprises a stainless steel mesh screen disposed circumferentially within a thermoplastic cage such that beverage leafs and grounds are contained inside when hot water is poured thereon.

4. The multi-function beverage brewer as recited in claim 1 wherein said filter basket further comprises a perforated bottom.

5. The multi-function beverage brewer as recited in claim 1 wherein said filter basket is formed with a thermoplastic material selected from the group consisting of polypropylene, acrylic, allyl diglycol carbonate, polycarbonate, polystyrene, polysulfone, polyester sulfone and polyester.

6. The multi-function beverage brewer as recited in claim 1 wherein basket/cup cover is formed with a thermoplastic material selected from the group consisting of polypropylene, acrylic, allyl diglycol carbonate, polycarbonate, polystyrene, polysulfone, polyester sulfone and polyester.

7. The multi-function beverage brewer as recited in claim 1 wherein said storage container further having a recessed groove therein and a circumferential gasket imbedded within the recessed groove.

8. The multi-function beverage brewer as recited in claim 1 wherein said storage container further having a plurality of hand gripping protrusions on a peripheral edge.

9. The multi-function beverage brewer as recited in claim 1 wherein said storage container further having internal threads for mating with said storage container lid.

10. The multi-function beverage brewer as recited in claim 1 wherein said storage container and storage container lid are formed with a thermoplastic material selected from the group consisting of polypropylene, acrylic, allyl diglycol carbonate, polycarbonate, polystyrene, polysulfone, polyester sulfone and polyester.

11. The multi-function beverage brewer as recited in claim 1 wherein said storage container lid further having external threads for mating with said storage container.

12. The multi-function beverage brewer as recited in claim 1 wherein said storage container lid further having a plurality of finger protrusions on a top surface.

13. The multi-function beverage brewer as recited in claim 1 wherein said travel mug further comprises a stainless steel construction.

14. The multi-function beverage brewer as recited in claim 1 wherein said filter basket/beverage residue holding cup is formed with a thermoplastic material selected from the group consisting of polypropylene, acrylic, allyl diglycol carbonate, polycarbonate, polystyrene, polysulfone, polyester sulfone and polyester.

* * * * *